United States Patent
Kawagishi (10) Patent No.: US 6,707,892 B2
(45) Date of Patent: Mar. 16, 2004

(54) APPLICATION TERMINAL

(75) Inventor: Toshiyuki Kawagishi, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 266 days.

(21) Appl. No.: 09/813,132

(22) Filed: Mar. 21, 2001

(65) Prior Publication Data

US 2002/0080935 A1 Jun. 27, 2002

(30) Foreign Application Priority Data

Dec. 26, 2000 (JP) ........................................ 2000-395291

(51) Int. Cl.[7] ............................................. H04M 11/00
(52) U.S. Cl. ...................... 379/93.05; 235/375; 705/41; 902/22
(58) Field of Search ..................... 379/90.01, 93.02, 379/93.08, 93.12, 93.05, 93.37, 93.29; 235/375, 379–382.5; 705/41–43; 902/22, 24–26

(56) References Cited

U.S. PATENT DOCUMENTS 5,212,369 A * 5/1993 Karlisch et al. ............ 235/380

FOREIGN PATENT DOCUMENTS

| EP | 0 887 774 | * 12/1998 |
|----|-----------|-----------|
| JP | 2000-148456 | 5/2000 |
| JP | 2000-222363 | 8/2000 |
| JP | 2000-236326 | 8/2000 |

* cited by examiner

*Primary Examiner*—Wing Chan
(74) *Attorney, Agent, or Firm*—Pillsbury Winthrop LLP (57) ABSTRACT

An IC card terminal device reads functions stored in an IC card inserted therein, and displays them on its screen. The card user selects that one of the functions, which they intend to execute. The IC card terminal device determines whether or not it has an application corresponding to the selected function. If the terminal device does not have the application, it reads information stored in the IC card and related to the function. On the basis of the information, the terminal device is connected to a host apparatus as a service provider, thereby downloading a necessary application therefrom. After that, the downloaded application corresponding to the selected function is executed.

14 Claims, 7 Drawing Sheets

| SERVICE PROVIDER | DEBIT ASSOCIATION |
|---|---|
| CONTACT NAME OF SERVICE PROVIDER | 0120 - 123 - 567 |
| COMMUNICATION PROTOCOL | TCP / IP (PPP) |
| LOG - IN NAME | DEBIT |
| LOG - IN PASSWORD | TflSLm |
| APPLICATION NAME | DEBITAPL |

APPLICATION TERMINAL

CROSS-REFERENCE TO RELATED APPLICATIONS

This application is based upon and claims the benefit of priority from the prior Japanese Patent Application No. 2000-395291, filed Dec. 26, 2000, the entire contents of which are incorporated herein by reference.

BACKGROUND OF THE INVENTION

The present invention relates to an application terminal for processing a portable electronic device such as an IC card used for providing various services, also to a processing system using the application terminal for processing the portable electronic device, and to a method for processing the portable electronic device.

Currently available application terminals of this type (hereinafter referred to as "IC card terminal devices") have only a predetermined function, and execute processing only when the IC card inserted therein is suitable for the function. On the other hand, in recent years, IC cards each have come to be provided with a plurality of functions, and therefore to demand an IC card terminal device for each function thereof.

To meet this demand, Japanese Patent Application KOKAI Publication No. 9-259239 discloses an IC card terminal device for processing IC cards having a plurality of functions. This device has a plurality of applications and executes selected processing on IC cards corresponding to the applications.

Although this IC card terminal device can execute the predetermined plurality of applications, it cannot process an IC card having a function (application) that is not included in them.

In light of, for example, the memory capacity, it is difficult to provide an IC card terminal device with all applications. Further, the installation of a large-capacity memory in the terminal device makes it expensive. Accordingly, it is necessary to prepare a plurality of IC card terminal devices each having selected applications. As a result, the owner of an IC card has to find an IC card terminal device that corresponds to their requested application.

BRIEF SUMMARY OF THE INVENTION

It is the object of the invention to provide a terminal device capable of executing various processes corresponding to different purposes, a system for processing various types of portable electronic devices, and a method for processing the portable electronic devices.

In order to achieve the object, according to one aspect of the invention, there is provided a terminal device for processing a portable electronic device having at least one function, comprising: reading means for reading the function from the portable electric device; determination means for determining whether or not the terminal device has an application corresponding to the function read by the reading means; first execution means for executing the application if the determination means determines that the terminal device has the application; download means for downloading the application from an external apparatus connected to the terminal device if the determination means determines that the terminal device does not have the application; and second execution means for executing the application downloaded by the download means.

The terminal device of the invention further comprises selection means for selecting a desired one of a plurality of functions when the reading means has read the plurality of functions from the portable electronic device, and wherein the termination means determines whether or not the terminal device has an application corresponding to the desired function selected by the selection means.

In other words, if the terminal device does not have an application for executing the function of the IC card inserted therein, it downloads the application from an external apparatus via a telephone line or the Internet, etc. The terminal device processes the function by executing the downloaded application.

Further, when the IC card inserted in the terminal device has a plurality of functions, the terminal device displays the functions and the card user selects a desired one of the functions. If the terminal device does not have an application for executing the selected function, it downloads the application from an external apparatus via a telephone line or the Internet, etc.

When downloading the application, the terminal device transmits a download request to the external apparatus. Upon receiving the download request, the external apparatus supplies the IC card via the terminal device with a confirmation request that contains information for confirming whether or not the IC card is valid. The IC card, in turn, processes the information contained in the confirmation request, and transmits the process result to the external apparatus via the terminal device. The external apparatus judges the validity of the IC card on the basis of the process result. If the IC card is determined valid, the external apparatus allows the terminal device to download the application.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the invention will be described with reference to the accompanying drawings.

Figure 1:
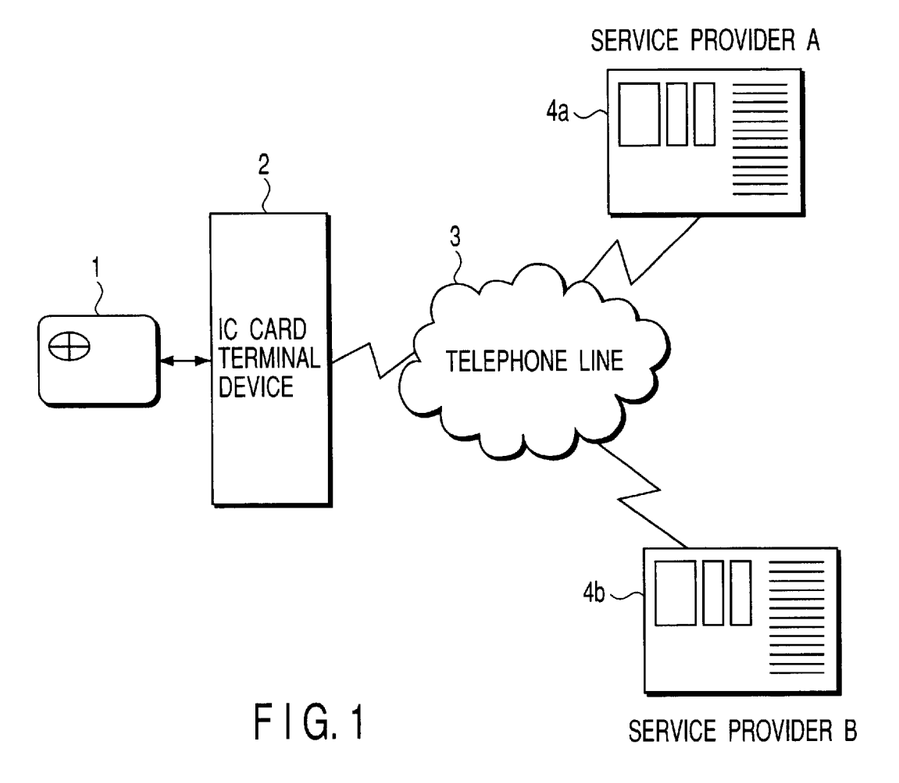
FIG. 1 is a schematic view illustrating an IC card processing system according to the embodiment of the invention.

FIG. 1 schematically shows an IC card processing system, according to the embodiment of the invention, for processing an IC card as a portable electronic device. In FIG. 1, an IC card 1 as a portable electronic device is usually carried by the user. The IC card is used to utilize various services (i.e. used as credit card and a debit card, etc.), and hence has a plurality of functions (applications). Thus, the IC card 1 can function as a credit card, a debit card, a prepaid card, a rental-shop card and a golf-members card, etc. An IC card terminal device 2 for processing the IC card 1 is installed in a place where the users usually use the IC cards 1. The IC card terminal device 2 can be connected, via a telephone line 3 or the Internet, etc., to a service-providing server (host apparatus) 4a, 4b, . . . for providing a service to the IC card 1, which is an external apparatus of the IC card terminal device 2.

Figure 2:
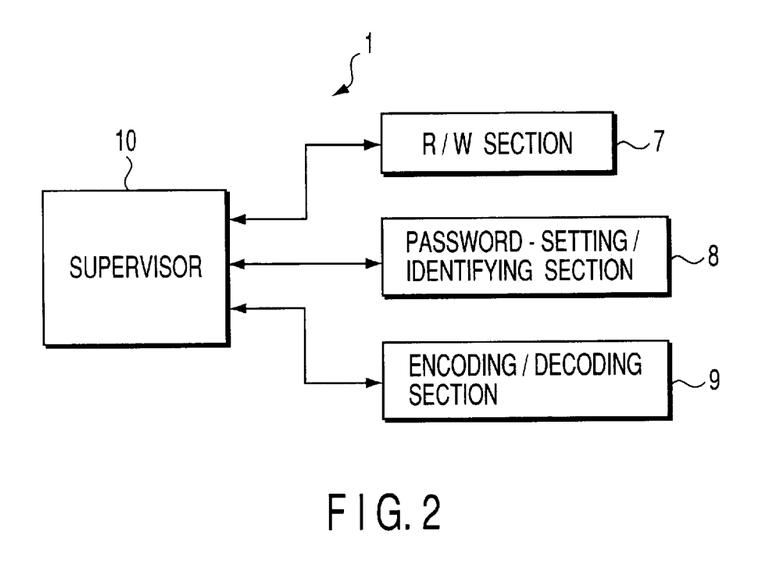
FIG. 2 is a block diagram illustrating functions of an IC card.

As shown in the block diagram of FIG. 2, the IC card 1 comprises a section for executing basic functions, which includes a read/write section 7, a password setting/identifying section 8, and an encoding/decoding section 9, and a supervisor section 10 for managing the basic functions.

The read/write section 7 executes data reading, writing and erasure on, for example, a data memory.

The password setting/identifying section 8 executes storage of a password set by the user and a process of inhibiting the reading of it. This section also has a function of executing password identification after setting the password, thereby determining whether or not a subsequent process should be allowed.

The encoding/decoding section 9 has a function of executing encoding for preventing leakage or forgery of data when transmitting the data to an external apparatus via, for example, a communication line, and decoding encoded data.

The supervisor section 10 has a function of decoding a function code or a function code with data input from the IC card terminal device 2, and executing the function code.

Figure 3:
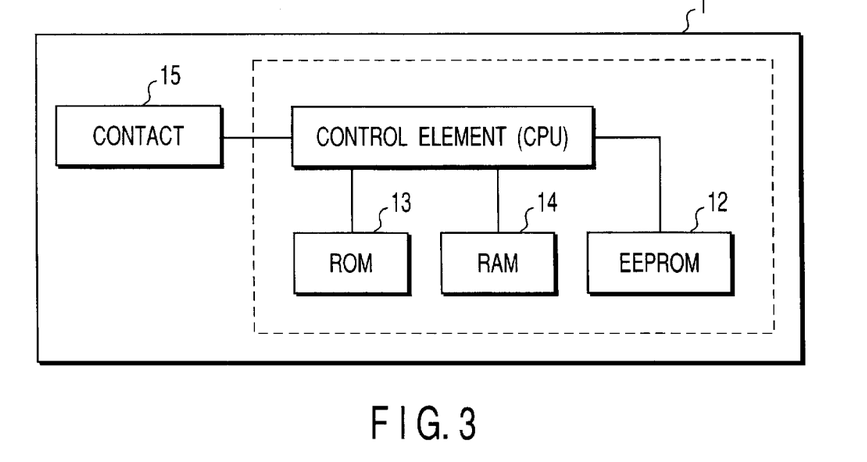
FIG. 3 is a schematic block diagram illustrating the structure of the IC card.

To realize the above functions, the IC card 1 further comprises, as shown in FIG. 3, a control element (control section) 11 such as a CPU, a data memory (EEPROM) 12, a program memory (ROM) 13, a work memory (RAM) 14 and a contact section 15 to be electrically connected to the IC card terminal device 2. The control element 11, the data memory 12, the program memory 13 and the work memory 14 are formed in a single IC chip (or a plurality of IC chips) and buried in the main body of the IC card.

The program memory 13 is formed of, for example, a mask ROM, and designed to store, for example, a control program for the control element 11, which includes subroutines for realizing the basic functions.

Figure 4A:
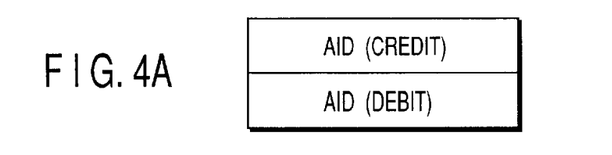
FIGS. 4A, 4B and 4C are views illustrating AID tables stored in the IC card.
Figure 4B:
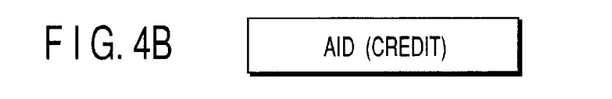
Figure 4C:
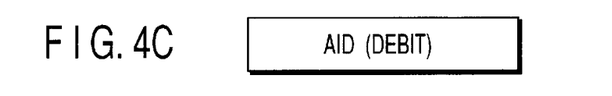

The data memory 12 is used to store various types of data, and formed of a non-volatile programmable memory such as the shown EEPROM or a flash EEPROM, etc. For example, the data memory 12 stores an application-identifying-data table (hereinafter referred to simply as an "AID table") as shown in FIG. 4A, 4B or 4C. The AID tables store AID information (function identifying information) indicative of functions included in the IC card 1. FIG. 4A shows a case where the data memory 12 stores AID information related to a credit function and a debit function. FIG. 4B shows another case where the data memory 12 stores AID information related to only the credit function, and FIG. 4C shows a further case where the data memory 12 stores AID information related to only the debit function. Hereinafter, a description will be given of the case where the data memory 12 of the IC card 1 stores AID information related to both the credit function and the debit function.

Figure 5:
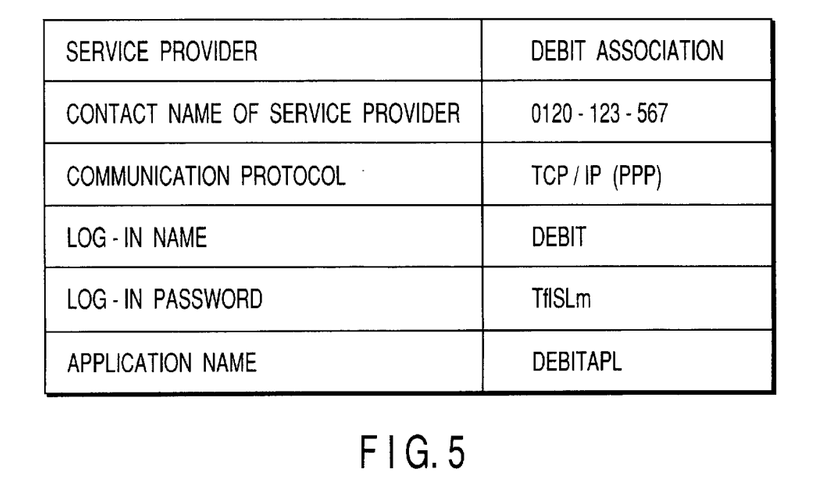
FIG. 5 is a view showing examples of information pieces related to AID information.

The data memory 12 also stores information associated with the AID information, as shown in FIG. 5, linking it with the AID information. The information associated with the AID information includes the name of a service provider, a contact name of the service provider (telephone number or an address on the Internet), a communication protocol, a login name, a login password and an application name, etc.

The work memory 14 is formed of, for example, a volatile memory such as a RAM.

Figure 6:
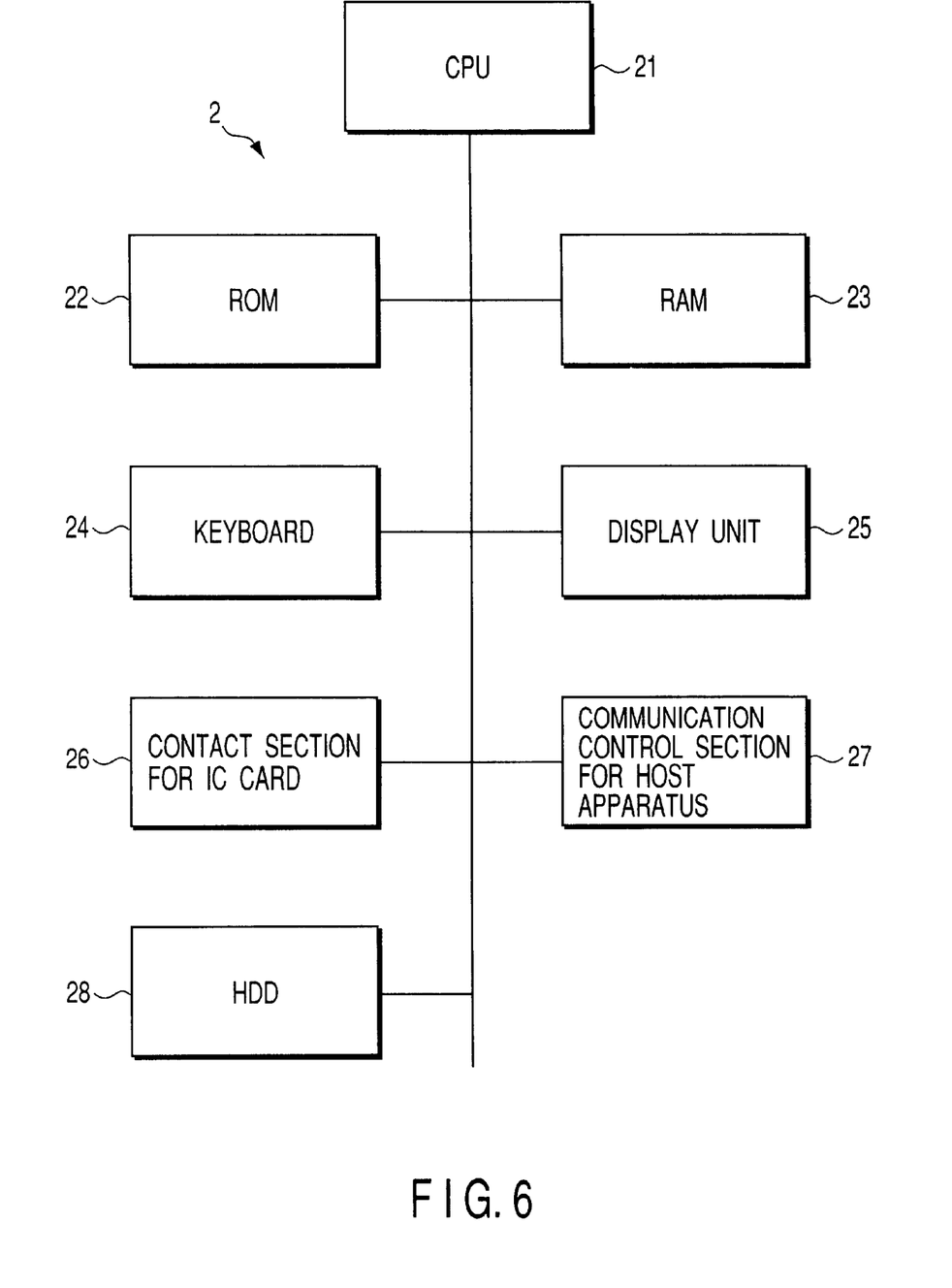
FIG. 6 is a schematic block diagram showing the structure of an IC card terminal device.

FIG. 6 schematically shows the structure of the IC card terminal device 2. The IC card terminal device 2 comprises a CPU 21 for controlling the entire device, a ROM 22 storing a control program for the CPU 21, ID information of installed applications, a RAM 23 for temporarily storing data, a keyboard 24, a liquid crystal display unit 25, a contact section 26 to be electrically connected to the IC card 1, a communication control section 27 enabling communication with a host apparatus 4a, 4b, . . . , as an external apparatus, and a hard disk drive (HDD) 28.

Figure 7:
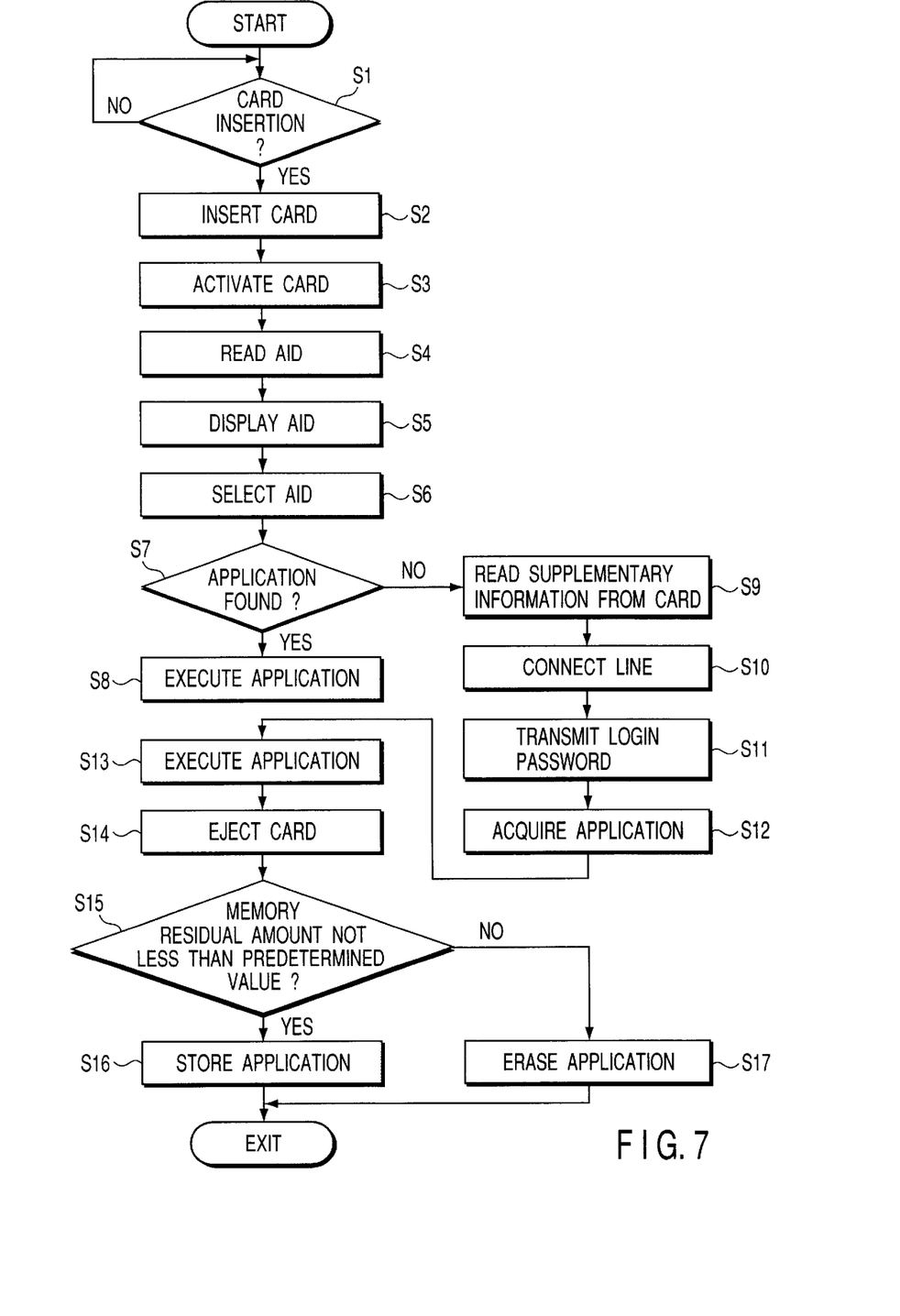
FIG. 7 is a flowchart useful in explaining the operation of the IC card terminal device.

Referring now to the flowchart of FIG. 7, the operation of the IC card terminal device 2 constructed as above will be described.

The CPU 21 of the IC card terminal device 2 waits for the insertion of the IC card 1 (step S1). When the user of the card 1 has inserted the IC card 1 into a card slot (not shown) incorporated in the device 2, the CPU 21 activates the inserted IC card 1, thereby reads the functions of the IC card 1 (step S2–S4). In this case, the CPU 21 reads AID information stored in the AID table of the inserted IC card 1. The process at the step S4 corresponds to reading means employed in the invention. Between the step S3 and S4, there may be provided a process of requesting the card user to input their password. If, in this case, the input password is invalid, a warning message may be generated to the card user, thereby requesting them to re-input the password. Only if the password is valid, the program proceeds to the step S4.

Figure 8:
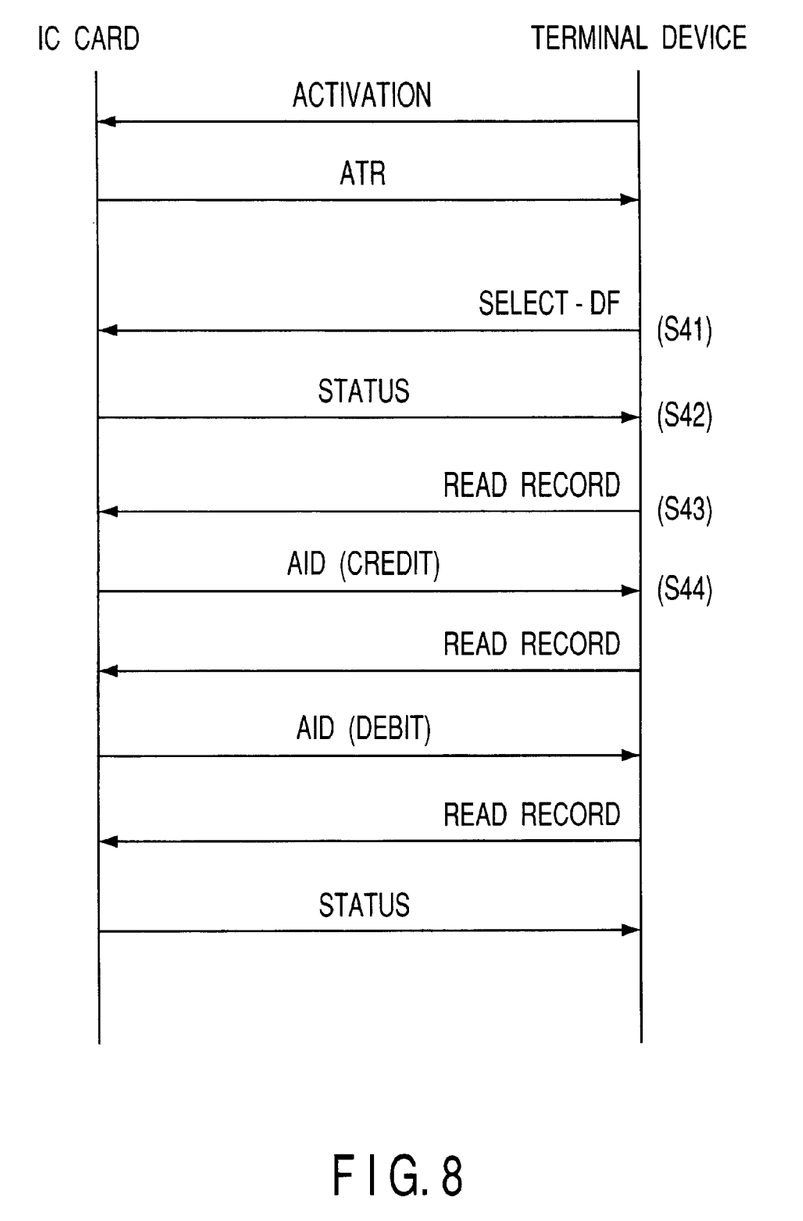
FIG. 8 is a flowchart useful in explaining a process of reading AID information.

Referring then to the flowchart of FIG. 8, the AID information reading process will be described in detail. After the IC card terminal device 2 activates the IC card 1, the IC card 1 transmits ATR (Answer-To-Reset) data to the IC card terminal device 2. The IC card terminal device 2, in turn, transmits a DF (Directory File) select command (Select-DF) to the IC card 1, thereby selects the AID table shown in FIG. 4A (step S41).

Subsequently, the IC card terminal device 2 receives normal status data from the IC card 1 (step S42), thereby transmits thereto a read command (Read Record), and instructs the card 1 to select and read an information item stored in the AID table (step S43). Then, the IC card 1 transmits a first AID information item to the terminal device 2 (step S44). All AID information items can be read by repeating the above process a number of times corresponding to the number of the AID information items.

Thereafter, each AID information item read from the IC card 1 is displayed on the liquid crystal display unit 25 (step S5). At this time, the user selects that one of the displayed functions (AID information items), which they intend to execute, using the keyboard 24 (step S6). The CPU 21 of the IC card terminal device 2 retrieves the application ID information stored in the ROM 22, thereby comparing the selected AID information item with the retrieved ID information, and determines whether or not the IC card terminal device 2 contains an application corresponding to the selected AID information item (step S7).

The AID information read from the IC card 1 has contents, for example, as shown in FIG. 4A, i.e. an AID information item indicative of a credit function and an AID information item indicative of a debit function. If, on the other hand, the IC card terminal device 2 has only the credit function, it determines "exist" when the credit function is selected by the IC card, and determines "non-exist" when the debit function is selected.

The process at the steps S5 and S6 corresponds to selective means employed in the invention, while the process at the step S7 corresponds to determination means in the invention.

If it is determined at the step S7 that the selected function exists, the function (application) is executed (step S8). In the above case, the credit function is executed. As a result, the card user can execute the process desired. The process at the step S8 corresponds to first execution means in the invention.

If it is determined at the step S7 that the selected function does not exist, the IC card terminal device 2 reads information (supplementary information) associated with the AID information (step S9). As shown in FIG. 5, this associated information is needed to download a target application and includes the name of a service provider, a contact name of the service provider, a communication protocol, a login name, a login password and the name of the application, etc.

On the basis of the associated information read from the IC card 1, the IC card terminal device 2 telephones a host apparatus as the service provider, for example, the host apparatus 4a, whereby they are connected to each other (step S10).

After that, the login name and the password included in the associated information are transmitted to the host apparatus 4a (step S11). After the information items are identified by the host apparatus 4a as the service provider, the application name is transmitted to the host apparatus 4a, whereby the IC card terminal device 2 receives a corresponding application from the host apparatus 4a and downloads it (i.e. stores it in the RAM) (step S12). The process at the steps S9–S12 corresponds to download means employed in the invention.

Figure 9:
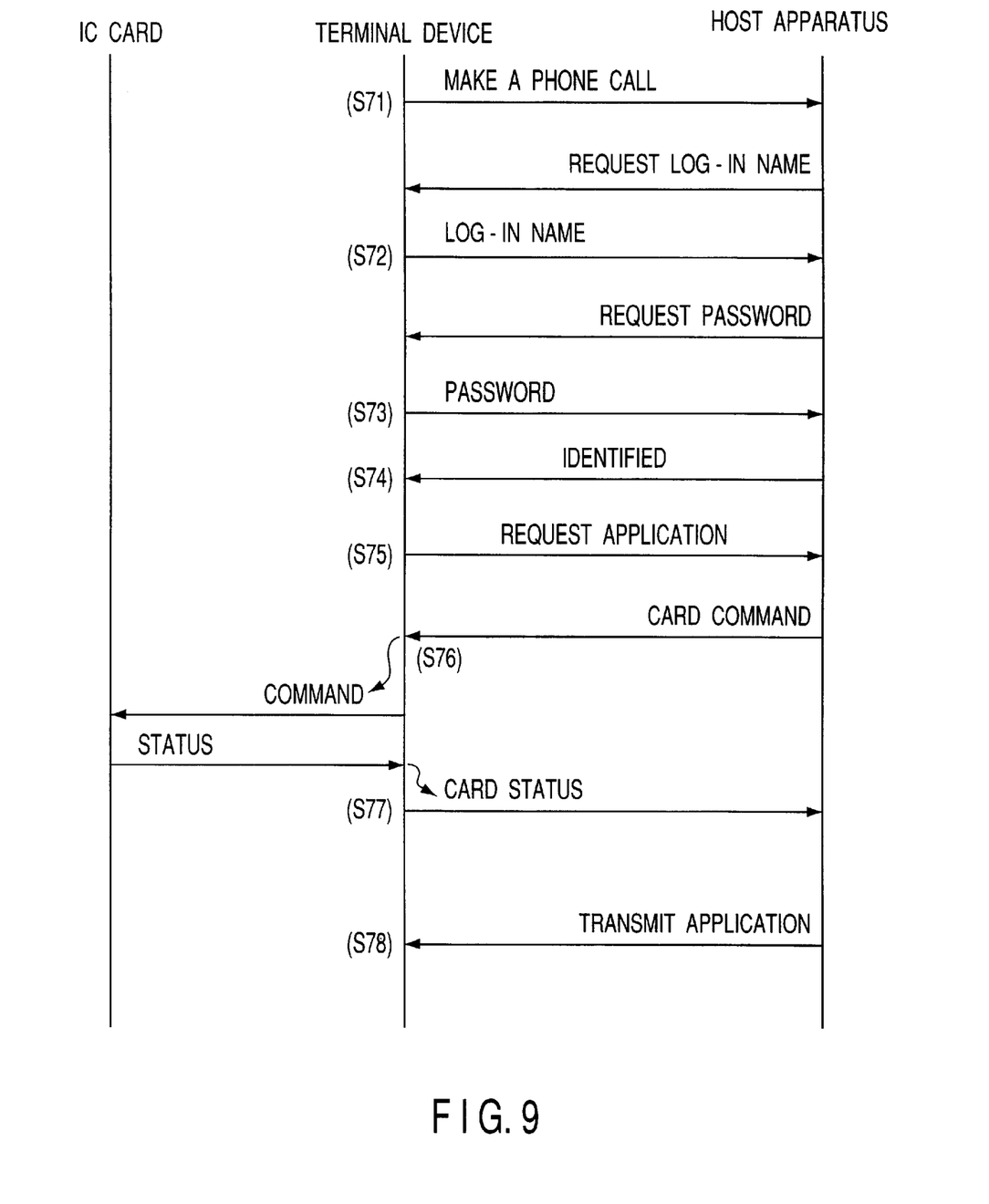
FIG. 9 is a flowchart useful in explaining a process of downloading a function.

The function downloading process at the steps S10–S12 will be described in more detail with reference to the flowchart of FIG. 9. First, the IC card terminal device 2 telephones the host apparatus 4a as the service provider, whereby they are connected to each other (step S71). The protocol used for the connection corresponds to that included in the associated information. In the case of FIG. 5, the protocol is TCP/IP.

Thereafter, in response to a request from the host apparatus 4a, the IC card terminal device 2 transmits the login name included in the associated information to the host apparatus 4a (step S72). Further, in response to a request from the host apparatus 4a, the IC card terminal device 2 transmits the login password included in the associated information to the host apparatus 4a (step S73).

After the IC card 1 is identified by the host apparatus 4a on the basis of the login name and the login password (step S74), the IC card terminal device 2 transmits the application name included in the associated information to the host apparatus 4a, thereby the IC card terminal device 2 requests a desired application (step S75).

Upon receiving a request for the desired application, the host apparatus 4a transmits a confirmation card command to the IC card terminal device 2 in order to confirm whether or not the IC card 1 is valid. The IC card terminal device, in turn, transmits the card command to the IC card 1 (step S76).

Upon receiving the card command, the IC card 1 processes the command, and returns information indicative of its status to the IC card terminal device 2. The IC card terminal device 2, in turn, transmits the card status information to the host apparatus 4a (step S77). The card command transmitted from the service provider requires an encoding process. The command consists of, for example, an Internal Authentication Command prescribed in the ISO, which is used for confirming whether or not the IC card 1 is a valid one.

More specifically, a command to encode a random number is supplied from the host apparatus 4a to the IC card 1 via the IC card terminal device 2. The IC card 1, in turn, encodes the random number, using a predetermined algorithm, and transmits the encoded random number as status information to the host apparatus 4a via the IC card terminal device 2. Upon receiving the status information, the host apparatus 4a decodes the encoded random number, using a decoding algorithm corresponding to the encoding algorithm of the IC card 1, thereby confirms whether or not the IC card 1 is a valid one.

In this system, the validity of the IC card terminal device 2 is not confirmed when downloading an application.

After the request for an application from the IC card terminal device 2 is confirmed valid (i.e. the IC card 1 is confirmed valid), the host apparatus 4a transmits the requested application to the IC card terminal device 2 (step S78). The IC card terminal device 2 downloads the application from the host apparatus 4a.

After that, the IC card terminal device 2 executes the downloaded application, thereby executes a function desired by the card user (step S13). The process at the step S22 corresponds to second execution means in the invention.

After executing the downloaded application, the inserted IC card 1 is ejected (step S14), and the IC card terminal device 2 determines whether or not the memory residual amount of the HDD 28 is not less than a predetermined value (step S15). If the residual amount is not less than the predetermined value, the application downloaded in the RAM 23 is stored in the HDD 28 (step S16), whereas if it is less than the predetermined value, the application downloaded in the RAM 23 is erased (step S17).

Figure 10:
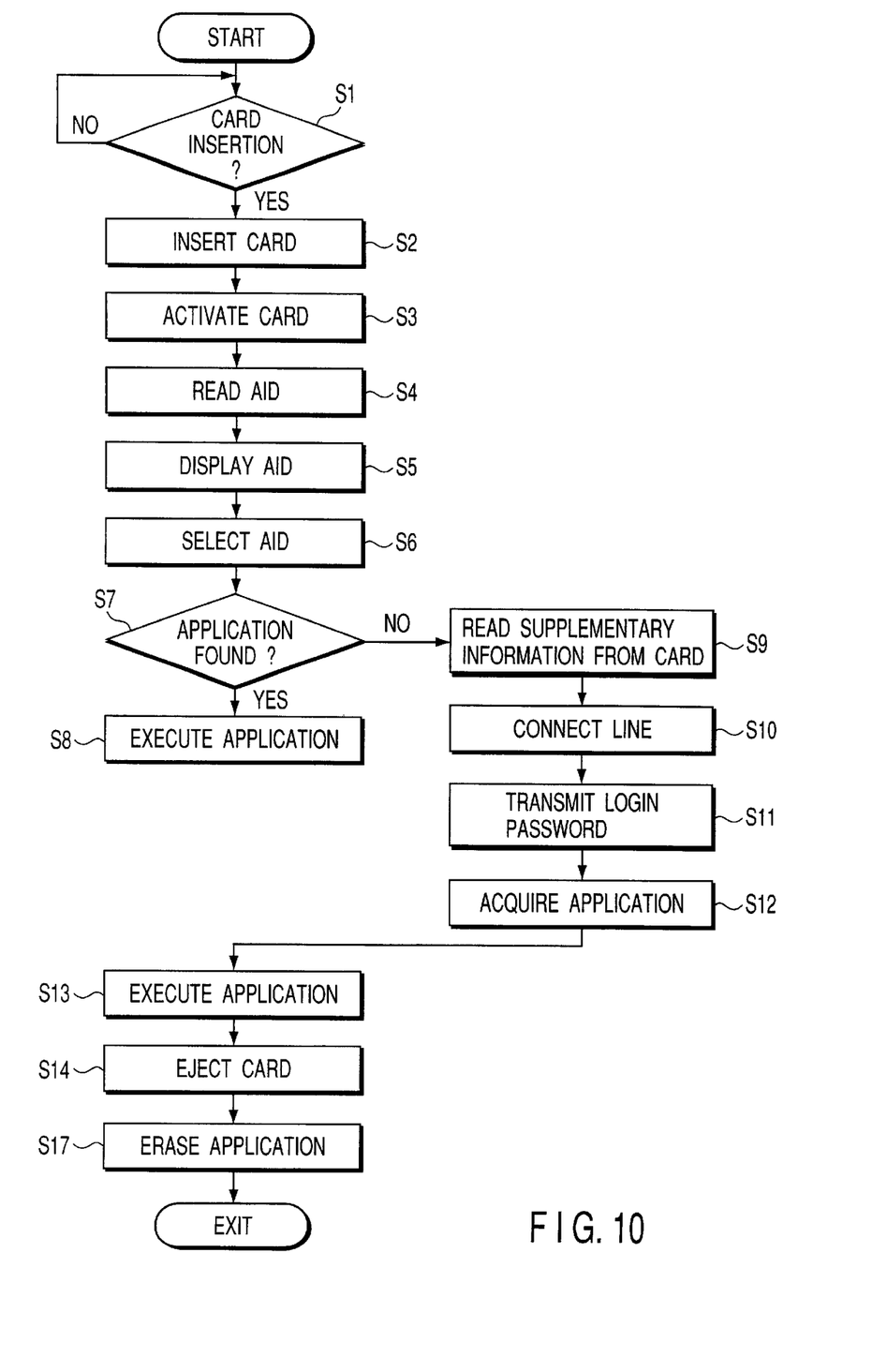
FIG. 10 is a flowchart useful in explaining a modification of the operation of the IC card terminal device.

The downloaded application may be erased irrespective of the memory residual amount of the HDD 28, after the desired function is executed. The flowchart of FIG. 10 shows this operation. In this case, unauthorized analysis and/or alteration of the downloaded application is prevented. For example, the remainder of the money stored in a prepaid card can be prevented from being illegally changed.

As described above, the IC card terminal device reads functions stored in an IC card inserted therein, and displays them on its display device. The card user selects that one of the displayed functions, which they intend to execute. The IC card terminal device determines whether or not it has the selected function and can execute it. If the function is executable, the terminal device executes it instantly. If, on the other hand, the terminal device does not have the selected function, it reads function information (associated information) stored in the IC card, and is connected to a host apparatus as a service provider on the basis of the read information, thereby downloading and executing a necessary function.

Thus, a single IC card terminal device can execute any one of functions belonging to an IC card. In other words, it is not necessary to prepare a plurality of IC card terminal devices having different functions as in the prior art.

It is a matter of course that where the IC card has only one function, and the IC card terminal device does not have the function, the IC card terminal device can execute the function by downloading an application corresponding to the function from a service provider.

In addition, although the above-described embodiment employs a card-shaped portable electronic device, the present invention is not limited to this. The invention is also applicable to an electronic device in the form of a block, such as a GSM (Global System for Mobile communication).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A terminal device for processing a portable electronic device having at least one function, comprising:
   means for storing an application;
   reading means for reading the function from the portable electric device;
   determination means for determining whether or not the storing means stores an application corresponding to the function read by the reading means;
   first execution means for executing the application if the determination means determines that the storing means stores the application;
   download means for downloading the application from an external apparatus connected to the terminal device in the storing means if the determination means determines that the storing means does not store the application; and
   second execution means for executing the application downloaded by the download means,
   wherein the download means includes:
      download request means for requesting download of the application from the external apparatus if the determination means determines that the storing means does not store the application;
      first reception means for receiving a confirmation request transmitted from the external apparatus in response to a request for download of the application issued by the download request means, the confirmation request for confirming whether or not the portable electronic device is valid;
      first transmission means for transmitting the confirmation request received by the first reception means to the portable electronic device;
      second reception means for receiving a response returned from the portable electronic device in response to the confirmation request transmitted to the portable electronic device from the first transmission means; and
      second transmission means for transmitting the response received by the second reception means to the external apparatus;
      the download means downloading the application, transmitted from the external apparatus in response to the response transmitted from the second transmission means.

2. The terminal device according to claim 1, further comprising selection means for selecting a desired one of a plurality of functions read from the portable electronic device when the reading means has read the plurality of functions from the portable electronic device, and wherein the determination means determines whether or not the storing means stores an application corresponding to the desired function selected by the selection means.

3. The terminal device according to claim 1,
   wherein the download means includes means for reading information related to the function stored in the portable electronic device, if the determination means determines that the storing means does not store the application, and
   wherein means for downloading the application by communicating with the external apparatus on the basis of the related information.

4. The terminal device according to claim 2, wherein the selection means includes means for displaying the plurality of functions read by the reading means, and means for selecting a desired function from the displayed functions.

5. The terminal device according to claim 1, wherein the download request means includes means for reading information related to the function stored in the portable electronic device, if the determination means determines that the storing means does not store the application, and means for requesting download of the application from the external apparatus by communicating with the external apparatus on the basis of the related information.

6. The terminal device according to claim 1, further comprising:
   storage determination means for determining whether or not the residual amount of the storing means is not less than a predetermined value after it is executed;
   storage control means for controlling to store downloaded application in the storing means if the storage determination means determines that the residual amount of the storing means is not less than a predetermined value; and
   erasure means for erasing the downloaded application if the storage determination means determines that the residual amount of the storing means is less than a predetermined value.

7. The terminal device according to claim 1, further comprising storage control means for controlling to store the downloaded application in the storing means after it is executed.

8. The terminal device according to claim 1, further comprising erasure means for erasing the downloaded application after it is executed.

9. A portable electronic device processing system including a terminal device for processing a portable electronic device having at least one function, and a host apparatus communicating with the terminal device for executing a predetermined process on the terminal device,
   wherein the terminal device comprises:
      reading means for reading the function from the portable electric device;
      selection means for selecting the function as a to-be-executed function when the reading means has read the function from the portable electronic device, and selecting one of a plurality of functions if the reading means has read the plurality of functions from the portable electronic device;

determination means for determining whether or not the terminal device has an application corresponding to the function selected by the selection means;

first execution means for executing the application if the determination means determines that the terminal device has the application;

request means for requesting download of the application from the host apparatus if the determination means determines that the terminal device does not have the application;

first transmission/reception means for receiving a confirmation request transmitted from the host apparatus in response to a request for download of the application issued by the request means, the confirmation request including confirmation information for confirming whether or not the portable electronic device is valid, the first transmission/reception means also for transmitting the confirmation information to the portable electronic device;

second transmission/reception means for receiving a response returned from the portable electronic device in response to the confirmation information transmitted to the portable electronic device from the first transmission/reception means, the second transmission/reception means also for transmitting the response to the external apparatus, download means for downloading the application transmitted from the host apparatus in response to the response transmitted from the second transmission/reception means; and second execution means for executing the application downloaded by the download means, wherein the portable electronic device comprises:

request receiving means for receiving the confirmation request transmitted from the terminal device; and response transmission means for transmitting a response to the confirmation request, to the terminal device, and wherein the host apparatus comprises:

request transmission means for transmitting the confirmation request to the terminal device when the terminal device has requested download of the application from the host apparatus;

response receiving means for receiving the response transmitted from the terminal device in response to the confirmation request;

and transmission means for transmitting the application to the terminal device on the basis of the response received by the response receiving means.

10. A method of processing a portable electronic device having at least one function, employed in a terminal device connected to a host apparatus for providing a predetermined service having at least one application, comprising the steps of:

reading the function from the portable electric device;

determining whether or not the terminal device has an application corresponding to the read function;

executing the application if the terminal device is determined to have the application;

downloading the application from the host apparatus if the terminal device is determined not to have the application; and executing the application downloaded from the host apparatus, wherein the step of downloading the application includes the steps of:

requesting download of the application from the host apparatus if the terminal device does not have the application;

first receiving a confirmation request transmitted from the host apparatus in response to a request for download of the application issued by the terminal device, the confirmation request including confirmation information for confirming whether or not the portable electronic device is valid;

first transmitting the confirmation request to the portable electronic device;

second receiving a response returned from the portable electronic device in response to the confirmation request;

second transmitting the response to the host apparatus; and downloading the application transmitted from the host apparatus in response to the transmitted response.

11. The method according to claim 10, further comprising the step of selecting a desired one of a plurality of functions when the plurality of functions have been read from the portable electronic device, and wherein the determination step includes the step of determining whether or not the terminal device has an application corresponding to the desired function selected by the selection step.

12. The method according to claim 11, further comprising:

determining whether not the residual amount of the storing means is not less than a predetermined value after it is executed;

storing to store downloaded application if the storage determination steps determines that the residual amount of the storing means is not less than a predetermined value; and erasure means for erasing the downloaded application if the storage determination steps determines that the residual amount of the storing means is less than a predetermined value.

13. The method according to claim 10, wherein the step of downloading the application includes the step of reading information related to the function stored in the portable electronic device, if the terminal device does not have the application, and the step of downloading the application by communicating with the external apparatus on the basis of the related information.

14. The method according to claim 10, further comprising the step of erasing the application downloaded from the host apparatus after the downloaded application is executed.

* * * * *